US009987987B2

(12) United States Patent
van Stiphout et al.

(10) Patent No.: US 9,987,987 B2
(45) Date of Patent: Jun. 5, 2018

(54) ADJUSTMENT INSTRUMENT FOR AN EXTERIOR MIRROR UNIT FOR A VEHICLE

(75) Inventors: Paulus Gerardus Maria van Stiphout, Woerden (NL); Peter Alexander Hamming, Houten (NL)

(73) Assignee: MCi (Mirror Controls International) Netherlands B.V., Woerden (NL)

(*) Notice: Subject to any disclaimer, the term of this patent is extended or adjusted under 35 U.S.C. 154(b) by 114 days.

(21) Appl. No.: 13/878,012

(22) PCT Filed: Oct. 6, 2011

(86) PCT No.: PCT/NL2011/050681
§ 371 (c)(1),
(2), (4) Date: Jun. 28, 2013

(87) PCT Pub. No.: WO2012/047104
PCT Pub. Date: Apr. 12, 2012

(65) Prior Publication Data
US 2013/0321941 A1 Dec. 5, 2013

(30) Foreign Application Priority Data

Oct. 6, 2010 (NL) .................................... 2005468
Feb. 25, 2011 (NL) .................................... 2006301

(51) Int. Cl.
*G02B 7/182* (2006.01)
*B60R 1/06* (2006.01)
(Continued)

(52) U.S. Cl.
CPC ............... *B60R 1/06* (2013.01); *B60R 1/074* (2013.01); *B60R 1/062* (2013.01); *B60R 1/07* (2013.01); *B60R 1/072* (2013.01)

(58) Field of Classification Search
CPC .. B60R 1/00; B60R 1/006; B60R 1/02; B60R 1/025; B60R 1/06; B60R 1/062;
(Continued)

(56) References Cited

U.S. PATENT DOCUMENTS 6,022,113 A * 2/2000 Stolpe .................... B60R 1/074
248/479
6,130,514 A * 10/2000 Oesterholt ............. B60R 1/074
248/479
(Continued)

FOREIGN PATENT DOCUMENTS

CN 1933990 A 3/2007
CN 1938178 3/2007
(Continued)

OTHER PUBLICATIONS

International Search Report from PCT/NL2011/050681 (WO 2012/047104), dated Jan. 19, 2012.
(Continued)

*Primary Examiner* — Thomas K Pham
*Assistant Examiner* — Nicholas R Pasko
(74) *Attorney, Agent, or Firm* — Swanson & Bratschun, L.L.C.

(57) ABSTRACT

The invention relates to an adjustment instrument for an exterior mirror unit for a vehicle. The adjustment instrument comprises a housing which is pivotably adjustable between a park position, a drive position and a fold-over position with respect to a base. The adjustment instrument further comprises an electrical drive unit provided in the housing, and a drive ring for coupling with the electrical drive unit.

13 Claims, 8 Drawing Sheets

(51) Int. Cl.
  *B60R 1/074* (2006.01)
  *B60R 1/072* (2006.01)
  *B60R 1/062* (2006.01)
  *B60R 1/07* (2006.01)

(58) Field of Classification Search
  CPC ....... B60R 1/0625; B60R 1/064; B60R 1/066; B60R 1/07; B60R 1/072; B60R 1/074
  USPC .......................................... 359/841, 871–877
  See application file for complete search history.

(56) References Cited

U.S. PATENT DOCUMENTS

| | | | | |
|---|---|---|---|---|
| 6,390,630 | B1* | 5/2002 | Ochs | B60R 1/074 248/478 |
| 7,374,299 | B2* | 5/2008 | Brouwer | B60R 1/074 359/841 |
| 7,392,567 | B2* | 7/2008 | Brouwer | B60R 1/074 16/235 |
| 7,543,949 | B2* | 6/2009 | van den Brink | B60R 1/074 248/479 |
| 7,547,855 | B2* | 6/2009 | Brouwer | B60R 1/074 200/405 |
| 7,847,205 | B2* | 12/2010 | Brouwer | B60R 1/074 200/405 |
| 2007/0029180 | A1 | 2/2007 | Brouwer | |
| 2007/0035862 | A1 | 2/2007 | Brouwer | |
| 2007/0084707 | A1* | 4/2007 | van den Brink | B60R 1/074 200/329 |
| 2009/0229962 | A1 | 9/2009 | Brouwer | |
| 2009/0303625 | A1 | 12/2009 | Van Stiphout | |

FOREIGN PATENT DOCUMENTS

| | | |
|---|---|---|
| CN | 201998896 U | 10/2011 |
| EP | 0881124 | 12/1998 |
| EP | 1720733 B1 | 2/2005 |
| JP | U3008334 | 8/1914 |
| JP | U06-027335 | 9/1992 |
| JP | H11-078696 | 3/1999 |
| JP | A2003-004022 | 6/2001 |
| JP | 2009-536899 | 10/2009 |
| KR | 10-2007-007309 | 9/2006 |
| WO | WO 2005/113290 | 12/2005 |
| WO | WO 2007/133077 | 11/2007 |

OTHER PUBLICATIONS

Office Action dated May 12, 2014 from Korean patent application No. 10-2013-7010441 with English translation.
Office Action dated Dec. 1, 2014 from Japanese patent application No. 2013-532743 with English translation.
Office Action and search report dated Mar. 30, 2015 from Chinese patent application No. 201180056198.X with English translation.
Notice of Allowance from JP App No. 2013-532743 dated Mar. 6, 2017 with English translation.

* cited by examiner

ADJUSTMENT INSTRUMENT FOR AN EXTERIOR MIRROR UNIT FOR A VEHICLE

RELATED APPLICATIONS

This application is a 35 U.S.C. § 371 national phase application of PCT/NL2011/050681 (WO 2012/047104), filed on Oct. 6, 2011, entitled "Adjustment Mechanism", which application priority to Netherlands Application Serial Nos. 2006301, filed Feb. 25, 2011, and U.S. Pat. No. 2,005,468, filed Oct. 6, 2010, each of which is incorporated herein by reference in its entirety.

TECHNICAL FIELD

The invention relates to an adjustment instrument for an exterior mirror unit for a vehicle.

BACKGROUND

Adjustment instruments for an exterior mirror unit are generally known and are widely used on vehicles, for example, automobiles. Such an adjustment instrument usually comprises a housing which is pivotably adjustable between a park position, a drive position and a fold-over position. In the park position the exterior mirror unit extends substantially along the vehicle, with a mirror side facing the vehicle. In the drive position the exterior mirror unit is directed substantially transverse to the vehicle. In the fold-over position the exterior mirror unit extends substantially along the vehicle, with the mirror side facing away from the vehicle. For example in the event of an impact such as a collision, the exterior mirror unit can be moved to the fold-over position.

Adjusting the exterior mirror unit from the park position to the drive position and vice versa can be done electrically or manually. An electrically adjustable adjustment instrument is provided with an electrical drive in the housing which is couplable with a drive ring. Via the drive ring the housing can be pivoted around the base. Also in an electrically adjustable adjustment instrument, provision is made to allow the instrument to be manually adjusted between the park position and the drive position and/or fold-over position. A drawback of the known electrically adjustable adjustment instruments is that during manual adjustment the drive is subject to relatively large forces, which requires the drive to be made of relatively heavy and costly construction.

A further drawback of the known electrically adjustable adjustment instruments is that the position of the drive position is sometimes not well-defined so that the housing may start to vibrate during driving. Also, in that case the shape of the housing cannot properly align with the shape of the suspension point of the housing. This is not desirable for esthetic and aerodynamic reasons.

An object of the invention is to provide an electrically adjustable adjustment instrument that obviates at least one of the above-mentioned drawbacks.

SUMMARY

To this end, the invention provides an adjustment instrument for an exterior mirror unit for a vehicle comprising a housing which is pivotable with respect to a base between a park position, a drive position and a fold-over position, and which is provided with a first series of cams;

an electrical drive unit which is received in the housing for electrically driving the pivoting of the housing;

a drive ring which is under spring force and which is arranged for cooperation with the electrical drive unit;

a clutch ring which is provided on the drive ring, and which is arranged for transmitting the spring force;

a lock ring which is located on the housing and which is set up nonrotatably with respect to the base and which in the drive position receives spring force via the clutch ring and which outside the drive position is free of spring force;

a cam ring which is provided on the base, and which in the drive position is free of spring force and which outside the drive position receives spring force via the clutch ring;

a second series of cams which are set up nonrotatably with respect to the cam ring; wherein the series of cams interlock in the drive position and by the spring force can be pressed onto each other to define the drive position, and outside the drive position sit on each other and can slide over each other, and wherein the clutch ring, from the drive position towards the park position, is free to pivot with respect to the cam ring.

Providing two series of cams which define the drive position, and leaving the clutch ring free to pivot from the drive position to the park position can prevent the drive becoming subject to large forces during pivoting of the housing from the drive position in the direction of the park position.

When for the purpose of electrically driven pivoting of the housing from the drive position in the direction of the park position, while the series of cams interlock in the drive position, the clutch ring has a limited free stroke with respect to the housing and the cam ring between a first angular position in which the clutch ring transmits the spring force onto the housing and cams are pressed onto each other by the spring force, and a second angular position in which the clutch ring leaves the housing free and transmits the spring force onto the cam ring, so that the cams are not pressed onto each other by the spring force, it can be achieved that the drive upon electrically driven adjustment does not need to work against the spring force. The clutch ring can then remain axially at the same level with respect to the pivoting axis, so that the spring that supplies the spring action does not need to be compressed.

When for the purpose of manual pivoting from the drive position in the direction of the park position, while the series of cams move apart, the clutch ring has a free stroke with respect to the cam ring, and moves along with the housing, it can be achieved that the force of working against the spring is transferred via the cams, and while the drive, owing to free rotation of the clutch ring, remains unloaded. The drive, the clutch ring, the gear ring and the housing can then move along as a whole.

By providing the second series of cams on the base or the cam ring, the construction can be configured with minor play. Alternatively, the second series of cams may be provided, for example, on the lock ring. The lock ring can then be axially slidable with respect to the base, and be indirectly nonrotatably connected therewith.

When of each series the cams are placed in a ring, and the intermediate distance between a number of successive cams is unequal, it can be achieved that the series of cams in a first position interlock and in a second position can be mutually supported on each other in a stable manner. The pattern of spaced-apart arrangement of the cams in the series can then be selected such, for example, that the series between the fold-over position and the park position can interlock only in the drive position. The number of cams can then be selected to be, for example, greater than 5, or even greater than 10.

Furthermore, the invention provides an adjustment instrument for an exterior mirror unit for a vehicle comprising a housing which is pivotably adjustable between a park position, a drive position and a fold-over position with respect to a base, an electrical drive unit provided in the housing, a drive ring for coupling with the electrical drive unit, a stop which is configured for defining an end position of the drive ring in the drive position of the housing and which is configured for passing of the drive ring during adjustment of the housing.

By providing a stop which defines the end position of the drive ring in the drive position, the position of the drive position can be reliably determined. During electrical adjustment from the park position to the drive position the stop ensures that the end position of the drive ring is defined, for example, in that the drive ring runs against the stop, or in that a cam of the housing runs against the stop. During an electrical reset after a manual adjustment from the park position to the drive position, the drive ring can pass the stop to thereby arrive in the end position again, in the drive position of the housing. The stop is advantageously arranged to define the position of the drive ring in the drive position and to allow the drive ring to pass during adjustment.

Advantageously, the stop is of elastic design, so that the drive ring can pass the stop relatively simply during adjustment, for example, during an electrical reset.

According to an aspect of the invention the stop is provided on a stop ring. Such a stop ring may be coupled as a discrete component with the drive ring and/or the housing. By providing a stop ring the component can be relatively cheaply manufactured from plastic and be mounted relatively simply.

Advantageously, the stop ring is adjustable between a stop position in which the stop defines the end position and a release position in which the drive ring can pass the stop. Owing to the stop ring being adjustable between the stop position and the release position, in the stop position a fixed stop can be defined, and in the release position, owing to the at least partial elasticity of the stop ring, it can be simply achieved that the drive ring can pass the stop.

Preferably, the stop ring is provided with stop elements for determining the stop position and the release position. The stop elements can advantageously cooperate with the drive ring. The drive ring can be provided, for example, with upstanding edges, between which at least one of the stop elements can move.

In a simple manner, the stop may be configured for cooperation with the housing. For example, the stop may be fixedly connected with the housing via a flange, or the stop may be configured for cooperation with the housing via, for example, a sloping surface. In that case, the housing may be provided, for example, with a cam for cooperation with the stop.

The invention furthermore relates to an adjustment instrument for an exterior mirror unit for a vehicle comprising a housing which is pivotably adjustable between a park position, a drive position and a fold-over position with respect to a base; a self-braking electrical drive provided in the housing; a drive ring for coupling with the electrical drive; a clutch ring for cooperation with the drive ring; a lock ring configured on one side for cooperation with the clutch ring and configured on an opposite side for cooperation with the housing; a cam ring provided on the base, the cam ring being configured for cooperation with the clutch ring and the lock ring; wherein in the drive position the lock ring is under spring action for rotation-locking with the housing on one side and with the clutch ring on the other side and wherein during manual adjustment the lock ring is first uncoupled from the housing against the spring action for the further manual adjustment of the housing.

By, during manual adjustment, first uncoupling the lock ring from the housing to release the housing, the housing can thereupon be further manually adjusted. The relatively large uncoupling force that is needed to uncouple the lock ring and the housing can thus be taken up between the lock ring and the housing itself and is therefore not transmitted to the drive. The uncoupling force between the lock ring and the housing is in the order of magnitude of about 10 to about 20 Nm. As the drive remains free of this relatively large force, the drive unit and also the drive ring can be made of less heavy, for example, of plastic instead of steel, and cheaper design.

This is in contrast to the prior art where the clutch ring sits directly on the cam ring. During manual adjustment the clutch ring is uncoupled from the cam ring against the spring action. As a result, the relatively large uncoupling force acts on the drive since the drive is rotation-locked with the clutch ring. Because of the relatively large force passing through the drive, the drive unit and the drive ring are made of relatively heavy construction, for example, from steel.

In the drive position the lock ring is coupled with the housing on one side and with the clutch ring on the other side. Under the influence of the spring action, the lock ring is thus confined, rotation-locked, between the housing and the clutch ring, so that the housing has a positive rotation lock in the drive position. In the drive position the force of the spring action is led via the clutch ring and the lock ring to the housing, so that the housing can be placed in the drive position whilst rotation-locked. The exterior mirror unit can thus remain in the drive position against the forces of, for example, driving wind.

After the lock ring has been uncoupled from the housing and the lock ring has thus been released, the housing can further be manually adjusted relatively simply. The housing is clear of the lock ring and can rotate under the lock ring in a simple manner.

The clutch ring, during manual adjustment, is coupled to the housing by means of the drive. During further manual adjustment of the housing after uncoupling from the lock ring, the clutch ring can run over the cam ring.

The lock ring is adjustable between a first position in which it is coupled with the housing and a second position in which it has been moved in upward direction and is clear of the housing. In the drive position of the housing the lock ring is in the first position for rotation-locking of the housing. During manual adjustment of the housing, the lock ring uncouples from the housing and the lock ring is released, which allows the housing to be adjusted. The lock ring is rotation-locked with respect to the cam ring and hence with respect to the shaft, so that the lock ring can only perform an axial movement with respect to the shaft.

Preferably, the lock ring is provided on one side with a series of second cams for cooperation with a series of first cams on the housing. The lock ring is then provided on an opposite side with further cams for cooperation with corresponding further cams on the clutch ring. The series of second cams of the lock ring that cooperate with the series of first cams of the housing are preferably at an underside of the lock ring. The further cams of the lock ring that cooperate with the corresponding further cams of the clutch ring are usually at an upper side of the lock ring.

In the drive position the lock ring is in the first position, in which the series of second cams of the lock ring engage in the series of first cams of the housing. The series of cams then interlock. In the drive position the further cams of the clutch ring sit on the corresponding further cams of the lock ring, so that the force of the spring is led via the clutch ring and the lock ring to the housing to achieve a sufficient rotation lock in the drive position to define the drive position. A contact surface of the downwardly directed further cams of the clutch ring makes contact with a contact surface of the upwardly directed cams of the lock ring.

Further advantageous embodiments are represented in the dependent claims.

BRIEF DESCRIPTION OF THE DRAWINGS

The invention will be further elucidated on the basis of an exemplary embodiment of an adjustment instrument for a right-hand exterior mirror unit viewed in the driving direction, which is shown in the drawing. In the drawing.

DETAILED DESCRIPTION

Figure 1:
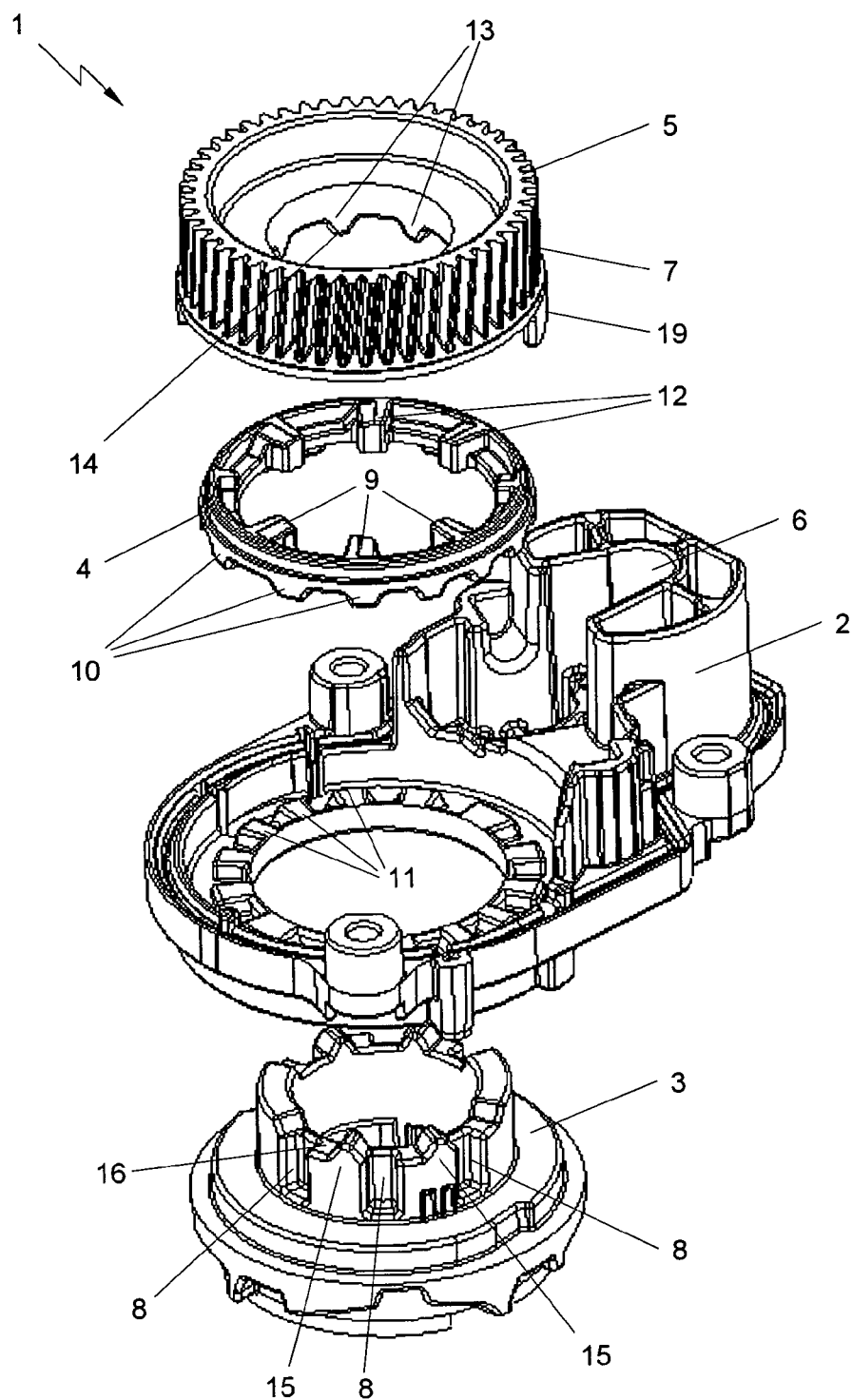
FIG. 1 shows a schematic perspective exploded view of an adjustment instrument according to the invention.

In the figures the same or corresponding parts are designated with the same reference numerals. It is noted that the figures are only shown by way of exemplary embodiment and should not be construed as limiting in any way.

FIG. 1 shows a schematic perspective exploded view of an adjustment instrument 1 according to the invention. FIG. 1 shows a housing 2, a cam ring 3, a lock ring 4 and a clutch gear 5. The clutch gear 5 is here designed as one part, but may also be designed as two parts which are rotation-coupled with each other, for example, a drive ring and a clutch ring. Such a drive ring and clutch ring may be, for example, axially movable with respect to each other. Possibly, the clutch ring can move up and down, while the axial position of the drive ring can remain substantially unchanged. The drive may then be more robust in design.

The cam ring 3 is couplable with a base which usually comprises a shaft, not shown, for example, by means of a bayonet coupling and/or a screw connection. The cam ring 3 is here designed as one part, but can also consist of two or more parts which are rotation-coupled with each other. The cam ring 3 is rotation-coupled with the base and thus forms the fixed world for the adjustment instrument 1.

The housing 2 is pivotable with respect to the base. The housing 2 is provided with a cavity 6 in which a drive unit can be received. The drive unit comprises an actuator which is couplable with the toothing 7 of the clutch gear by means of a pinion or worm wheel or otherwise. The drive unit can comprise a self-braking drive or a non self-braking drive.

The housing 2 is electrically adjustable between a park position and a drive position, but can also be manually adjusted between the park position and the drive position and/or fold-over position.

The lock ring 4 is arranged for cooperation with the housing 2 on one side and with the clutch gear 5 on the other side. The lock ring 4 is between the housing 2 and the clutch gear 5 and is rotation-coupled with the cam ring 3 and hence with the base. To that end, the cam ring 3 is provided with recesses 8 in which further cams 9 of the lock ring 4 can fall. Via the further cams 9 the lock ring 4 is axially movable with respect to the cam ring 3.

The lock ring 4 is provided at an underside thereof with a second series of cams 10 which can cooperate with a first series of cams 11 of the housing 2. The second series of cams 10 can fall between the first series of cams 11. The cam pattern of the series of cams 10 and 11 is such that the cams can interlock only in one or in a few pivoted positions.

The clutch gear 5 is provided with further cams 13 which can cooperate with the corresponding further cams 9 of the lock ring 4. The further cams 13 can sit on the corresponding further cams 9. An upper side 12 of the corresponding further cams 9 can cooperate with an underside 14 of the further cams 13 of the clutch gear 5. The side 12 of the corresponding further cams 9 abuts against the side 14 of the further cams 13. The upper side of the lock ring 4 and the underside of the clutch gear 5 are here designed with cooperating cams, but may also be designed, for example, as cooperating friction surfaces.

The further cams 13 of the clutch gear 5 can also cooperate with cam ring cams 15 of the cam ring 3, for example, during electrical adjustment to the park position. The cam ring cams 15 are provided with a running surface 16 on which the further cam 13 can run.

Figure 2:
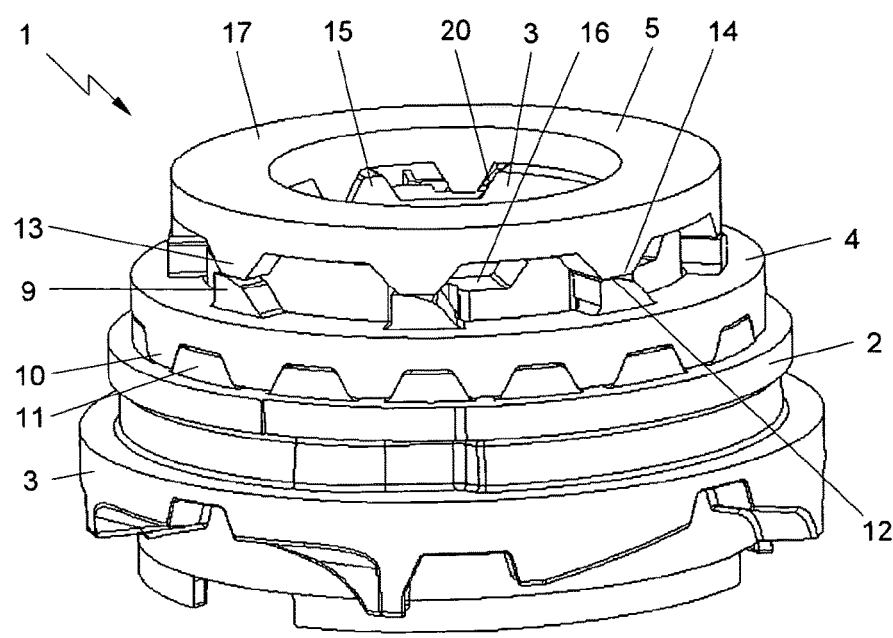
FIG. 2 shows a schematic perspective view of the adjustment instrument according to the invention in the drive position.

FIG. 2 shows the adjustment instrument 1 in the drive position; for clarity, only the series of first cams 11 of the housing 2 are shown. The adjustment instrument 1 is suitable to be placed in an exterior mirror unit 1 on the right-hand side of a vehicle, viewed in the driving direction.

The toothing of the clutch gear 5 is not shown in FIG. 2. In the drive position the lock ring 4 is in a first position in which the second series of cams 10 of the lock ring 4 cooperate with the series of first cams 11 of the housing 2. In the first position of the lock ring 4 the upper side 12 of the further cam 9 is substantially at the same level as the running surface 16 of the cam ring cam 15 of the cam ring 3. The side 14 of the further cam 13 of the clutch gear 5 in the drive position abuts against the upper side 12 of the further cam 9 of the lock ring 4. A spring, not shown, engages an upper side 17 of the clutch gear 5 and presses the clutch gear 5 downwards. The force of the spring, in the drive position, is transmitted via the further cams 13 of the clutch gear 5, the further cams 9 of the lock ring 4, and the second series of cams 10 of the lock ring 4 to the housing 2. Thus the housing 2 is relatively stably locked in the drive position.

Figure 3A:
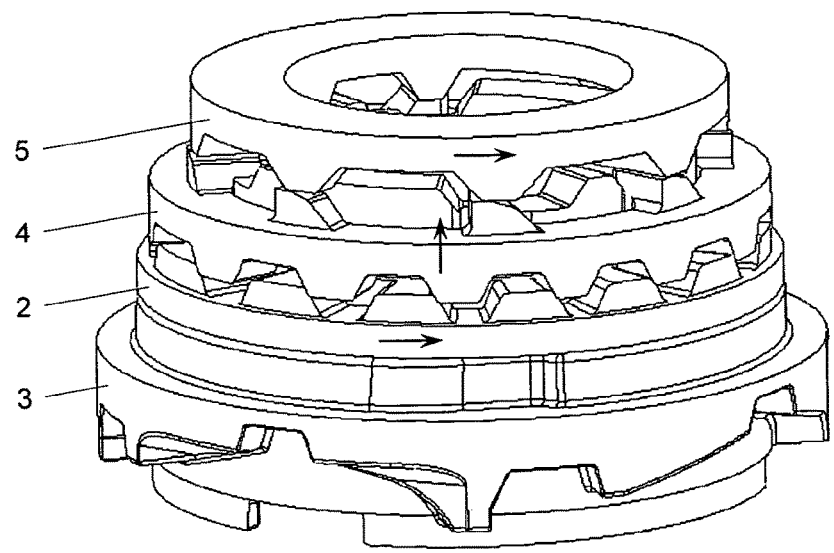
FIG. 3a shows a schematic perspective view of the adjustment instrument according to the invention during manual adjustment from the drive position to the fold-over position.
Figure 3B:
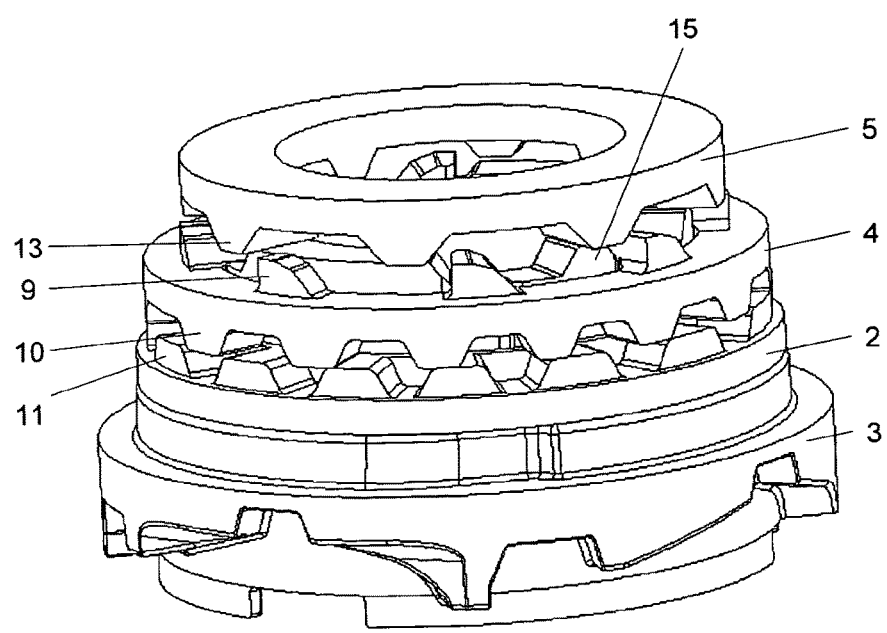
FIG. 3b shows a schematic perspective view of the adjustment instrument according to the invention in the fold-over position.

During manual adjustment from the drive position to the fold-over position, first the lock ring 4 is uncoupled from the housing 2 against the force of the spring, see FIG. 3a. The clutch gear 5 and the housing 2 are coupled to each other by means of the drive. During manual adjustment from the drive position to the fold-over position the housing 2 is pivoted counterclockwise. As a result, the lock ring 4 uncouples from the housing 2. The lock ring 4 moves upwards from the first position in which it is coupled with the housing 2 to the second position in which it is clear of the housing 2. The relatively large force that is needed to uncouple the housing 2 from the lock ring 4, about 10 to about 20 Nm, is taken up between the lock ring 4 and the housing 2. The drive is not subject to this load.

During manual adjustment from the drive position to the fold-over position, the housing 2 is first uncoupled from the lock ring 4 against the spring action. The relatively large uncoupling force, of about 10 to about 20 Nm, is substantially taken up between the housing 2 and the lock ring 4. The drive is not loaded, or hardly so. The lock ring 4 is thereby, as it were, lifted upwards from the first position towards the second position of the lock ring 4.

During displacement of the lock ring 4 to the second position, the clutch gear 5 continues to sit on the lock ring 4, as shown in FIG. 3a. The housing 2 can now rotate under the lock ring 4 in a relatively simple manner. During further manual adjustment of the housing 2 to the fold-over position, the housing 2 and hence the clutch gear 5 is further pivoted counterclockwise, so that the further cams 13 of the clutch gear 5 fall between the further cam 9 of the lock ring 4 and the cam ring cam 15 of the cam ring 3. To get into the fold-over position, the housing 2 is further pivoted counterclockwise and the further cams 13 of the clutch gear 5 are lifted onto the cam ring cams 15 of the cam ring 3. This requires a relatively small force to be overcome, about 1 to about 7 Nm, which passes through the drive. However, this force is slight enough to be taken up by the drive unit without appreciable problems and is less than in the manual adjustment of a known adjustment instrument according to the prior art. The drive unit can thus be manufactured from relatively inexpensive material, for example, plastic.

In the fold-over position, in this exemplary embodiment, at least a number of further cams 13 of the clutch gear 5 sit on the cam ring cams 15 of the cam ring 3. The cam pattern of the clutch gear 5 and/or of the cam ring 3 may be such that a number of further cams 13 of the clutch gear 5 float, but at least a number of further cams 13 of the clutch gear 5 rest on a number of cam ring cams 15 of the cam ring 3 to transmit the spring action via the cam ring 3 to the base.

In known adjustment instruments, during manual adjustment, the drive unit is subject to such high forces that it needs to be relatively robust and heavy in construction. Typically, a drive unit in an adjustment instrument 1 according to the prior art is implemented in steel, in particular the toothing of, for example, the drive ring and/or the worm is manufactured from steel.

Figure 4A:
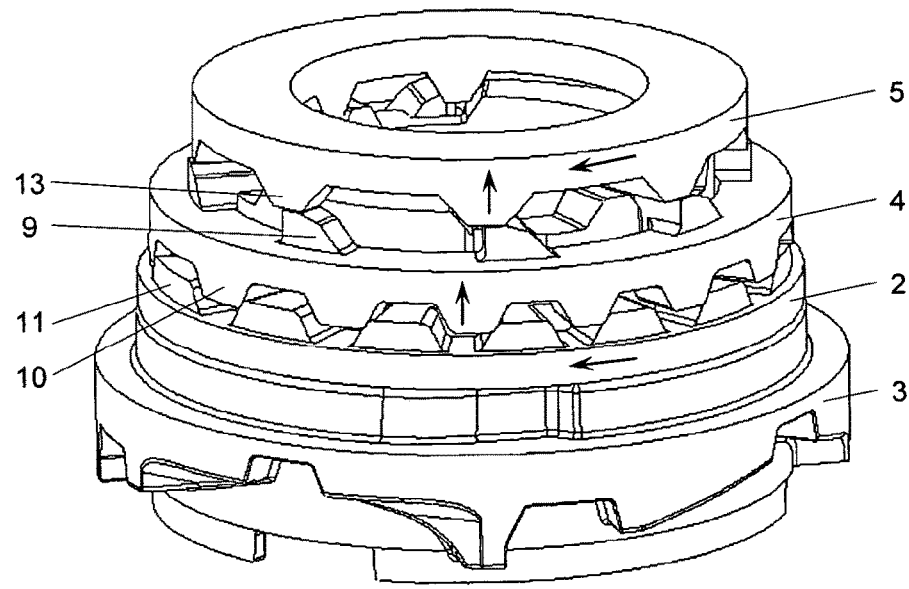
FIG. 4a shows a schematic perspective view of the adjustment instrument according to the invention during manual adjustment from the drive position to the park position.

During manual adjustment of the housing 2 from the drive position to the park position, shown in FIG. 4a, the housing 2 is uncoupled from the lock ring 4 against the spring action. The clutch gear 5 and the housing 2 are here moved clockwise towards the park position, for an adjustment instrument 1 on the right-hand side of the vehicle, viewed in the driving direction.

The relatively large force (about 10 Nm to about 20 Nm) needed for the uncoupling of the housing 2 from the lock ring 4 is substantially taken up by the housing 2 and the lock ring 4, and is not, or hardly so, transmitted to the drive unit.

During uncoupling of the lock ring 4, the lock ring 4 is moved from the first position upwards to the second position. As the clutch gear 5 sits on the lock ring 4, the clutch gear 5 is moved upwards along with it.

Figure 4B:
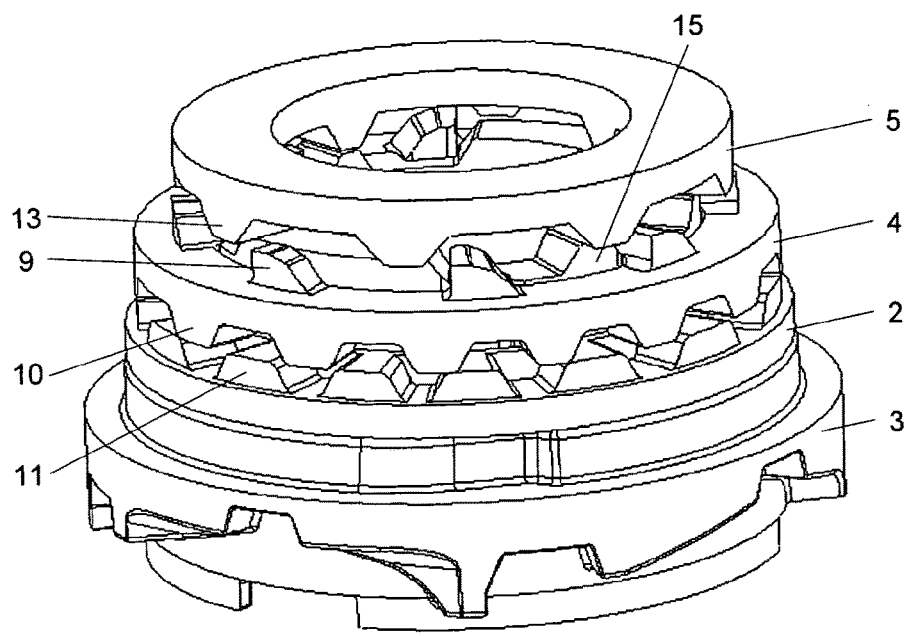
FIG. 4b shows a schematic perspective view of the adjustment instrument according to the invention in the park position after manual adjustment to the park position.

During the further manual adjustment of the housing 2 towards the park position, the housing 2, and the clutch gear 5 coupled therewith via the drive unit, is further moved clockwise. The further cams 13 of the clutch gear 5 run on the cam ring cams 15 of the cam ring 3, as the clutch gear 5 has already been lifted by the lock ring 4. The further cams 9 of the lock ring 4 have come to a level substantially equal to that of the cam ring cams 15 of the cam ring 3, so that the clutch gear 5 can run relatively simply on the cam ring cams 15 of the cam ring 3 during further manual adjustment of the housing 2. In the park position, shown in FIG. 4b, at least a number of further cams 13 of the clutch gear 5 sit on a number of cam ring cams 15 of the cam ring 3. Possibly, a number of further cams 13 may float, but at least a number of further cams 13 rest on a number of cam ring cams 15 of the cam ring 3 to transmit the spring action to the cam ring 3.

Figure 5:
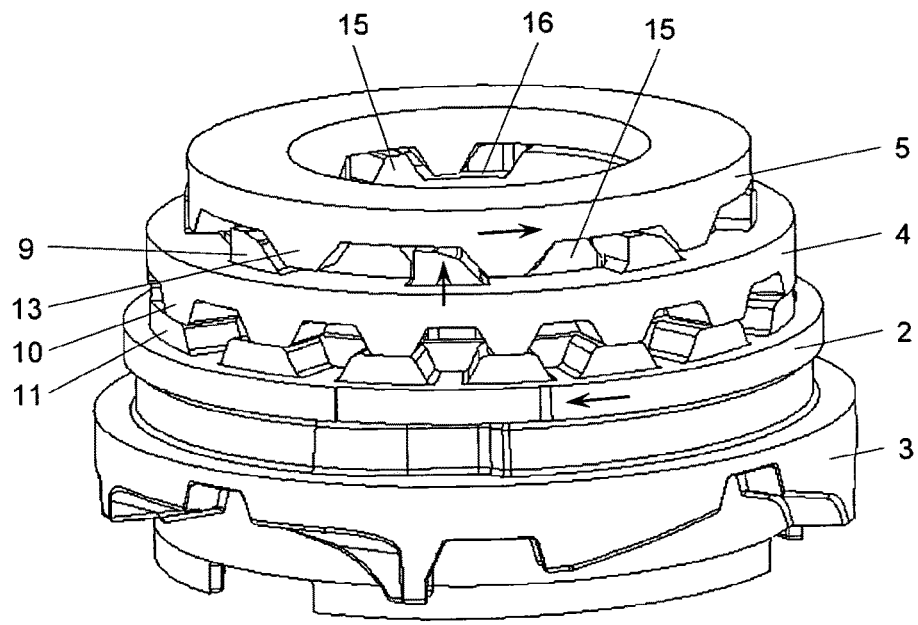
FIG. 5 shows a schematic perspective view of the adjustment instrument according to the invention during electrical adjustment from the drive position to the park position.

The housing 2 can also be electrically adjusted from the drive position to the park position, as shown in FIG. 5. The housing 2 now moves clockwise and the clutch gear 5 is driven by the drive unit and moves counterclockwise, see the arrows in FIG. 5. During electrical adjustment to the park position, the clutch gear 5 first moves over the running surfaces 16 of the cam ring 3 until abutting against the cam ring cams 15 of the cam ring 3. The lock ring 4 is thereby released from the spring action and it can relatively simply move to the second position to thereby release the housing 2. During further electrical adjustment the further cams 13 of the clutch gear 5 remain confined between the further cams 9 of the lock ring 4 and the cam ring cams 15 of the cam ring 3. The clutch gear 5 is thus rotation-locked with the fixed world of the cam ring 3. The housing 2 is moved clockwise to the park position.

Figure 6:
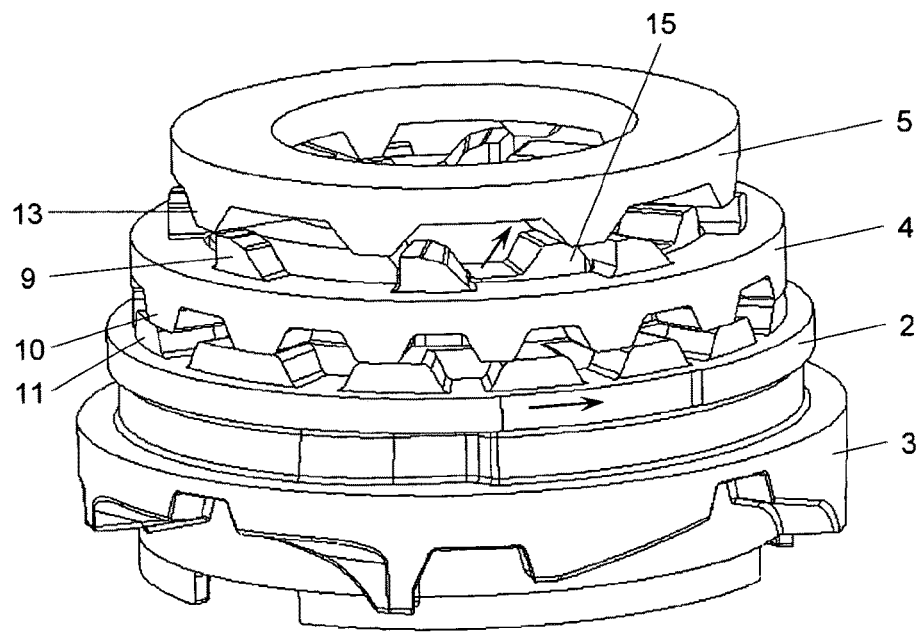
FIG. 6 shows a schematic perspective view of the adjustment instrument according to the invention during manual adjustment from the park position to the drive position.

The housing 2 can be manually adjusted from the park position, reached through electrical adjustment, to the drive position, see FIG. 6. The housing 2 and the clutch gear 5 coupled therewith via the drive unit are adjusted counterclockwise. The further cams 13 of the clutch gear 5 are moved onto the cam ring cams 15 of the cam ring 3. Moving the further cams 13 on the cam ring cams 15 requires a relatively small force, about 1 to about 7 Nm, which passes through the drive unit. The drive unit can take up this relatively small force. During further manual adjustment to the drive position, the further cams 13 of the clutch gear 5 move further until they end up sitting on the cam ring cams 15 of the cam ring 3. The spring action is then transmitted via the clutch ring 5 to the cam ring 3 and thus to the base. Once substantially in the drive position, usually an electrical reset is necessary to rotate the clutch ring 5 further until it rests on the lock ring 4 to transmit the spring action to the lock ring 4 and the housing 2. The electrical reset may be necessary to bring the adjustment instrument 1 into the drive position shown in FIG. 2. The lock ring 4 can move back again to the first position when the cam pattern of the lock ring 4 fits into the cam pattern of the housing 2. Preferably, the cam patterns of the underside of the lock ring 4 and the housing 2 are so designed that in a number of predefined positions they fit into each other to thereby define at least the drive position.

Figure 7:
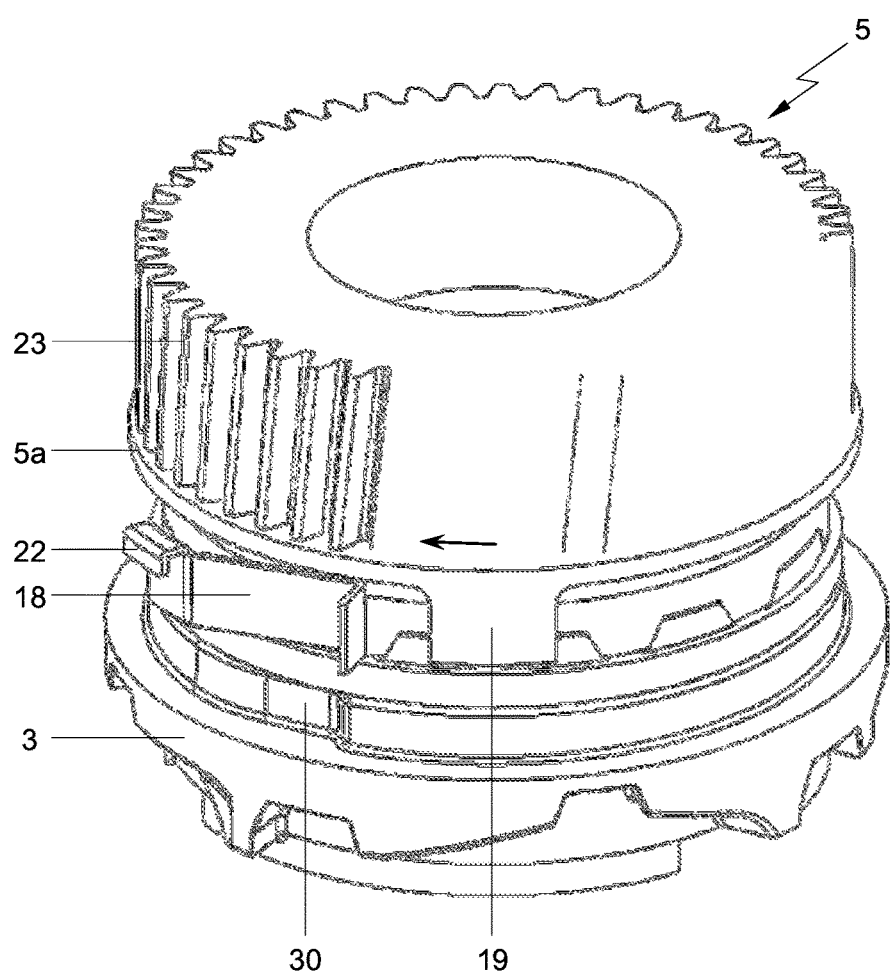
FIG. 7 shows a schematic perspective view of the adjustment instrument according to the invention with a stop for the drive ring.

FIG. 7 shows an exemplary embodiment of an adjustment instrument 1 according to the invention which further comprises a stop 18. During electrical adjustment of the adjustment instrument from the park position to the drive position, a leg 19 of the clutch gear 5, which in this exemplary embodiment comprises a drive ring 23, can run against the stop 18. The stop 18 defines an end position for the clutch gear 5 in the drive position, thereby achieving a gap 20, shown in FIG. 2, between the further cams 13 of the clutch gear 5 and the cam ring cams 15 of the cam ring 3. The gap 20 is favorable during manual adjustment of the adjustment instrument, allowing the further cams 13 to continue sitting on the further cams 9 of the lock ring 4 relatively long, before running further on the cam ring 3. In this way, the spring action can continue to act on the lock ring 4 sufficiently long to wholly uncouple the lock ring 4 from the housing 2.

The stop 18 is here designed as an elastic element 18, in particular as a flat spring, but other embodiments of the elastic element, such as a torsion spring or a coil spring or a rubber element, are also possible. The spring 18 can be accommodated in the housing 2 with a flange 22 and is thus rotation-coupled with the housing 2. The stop 18 may also be designed as a hard stop, possibly with a sloping side. During the electrical reset after a manual adjustment from the park position to the drive position, the leg 19 of the clutch gear 5 can be guided behind or over the stop 18 to get into a next position. The clutch gear 5 can then relatively simply run past the stop 18.

The leg 19 may be provided on an additional ring 5a. The additional ring 5a has two legs 19 here. The additional ring 5a may, as a separate part, be rotation-coupled with the clutch gear 5, but may also be an integral part of the clutch gear 5, as shown in FIG. 7. The additional ring 5a can also be part of the drive ring 23.

Further, it can be seen in FIG. 7 that the cam ring 3 is provided with an asymmetrical recess 30 in which a spring, for example a leaf spring, can be received. Such a spring is then clamped between the housing on one side and the fixed world of the cam ring 3 on the other side. During manual adjustment of the housing the spring can be guided out of the recess 30. In the drive position the spring is in the recess 30 to prevent play and/or vibrations of the housing with respect to the base.

During electrical adjustment towards the drive position, the lock ring 4 is uncoupled from the housing 2, and the lock ring 4, the cam ring 3 and the clutch gear 5 are coupled in a configuration according to the position shown in FIG. 5. The housing 2 moves with respect to the clutch gear 5 under the influence of the drive unit.

Figure 8:
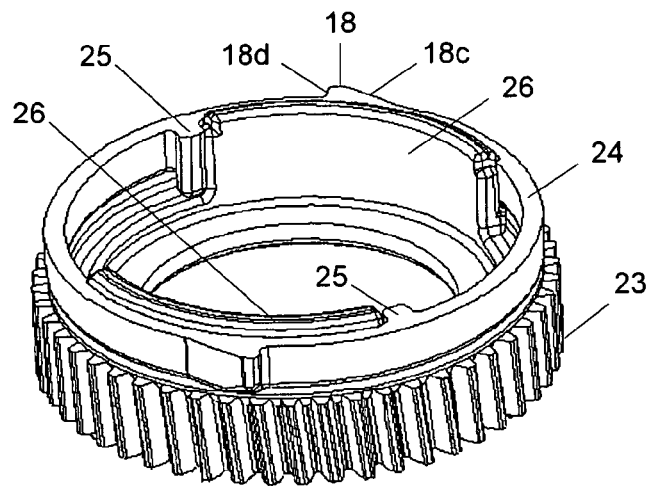
FIG. 8 shows a schematic perspective view of a drive ring with a stop according to the invention.

FIG. 8 shows a second exemplary embodiment of a stop 18, here provided on a stop ring 24. The stop ring 24 is here designed as a loose part which is adjustable with respect to a drive ring 23. The drive ring 23 may be coupled with a clutch ring and thus form a clutch gear 5, but may also be designed as a discrete part, as shown here.

Figure 9:
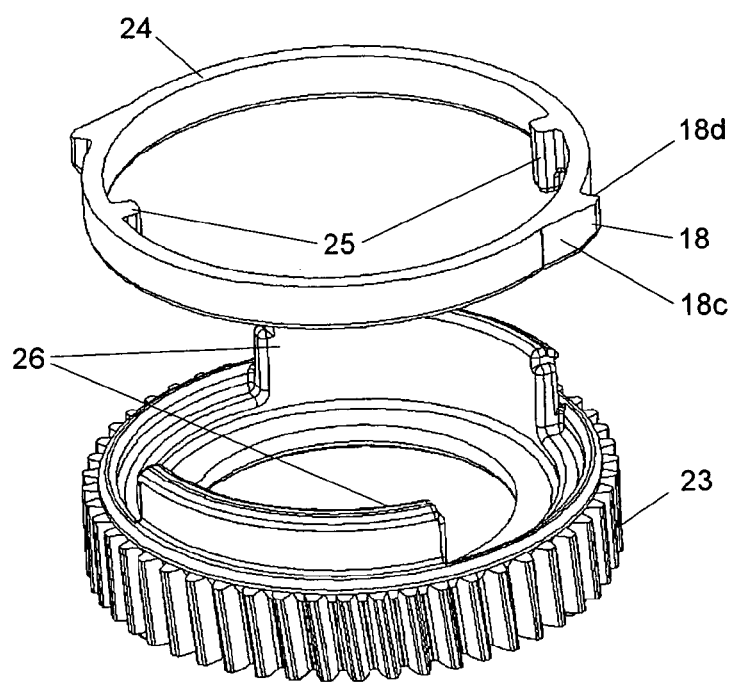
FIG. 9 shows a schematic exploded view of the drive ring with stop of FIG. 8.

The stop ring 24 in this embodiment is provided, on an outer wall thereof, with a stop 18, the stop 18 here being designed with a sloping surface 18c on one side and a substantially radial surface 18d on the other side. The stop ring 24 is furthermore provided, on an inner wall thereof, with stop elements 25. In this exemplary embodiment two stop elements 25 are provided, but there may also be provided just one or more than two. The stop ring 24 shown in FIG. 8 and FIG. 9 is adjustable between a stop position and a release position, the stop elements 25 thereby moving between upstanding edges 26 of the drive ring 23. However, the stop ring 24 may also be fixedly connected with, for example, the housing, like the stop 18 of FIG. 7.

In the stop position the stop 18 defines an end position of the drive ring 23 in the drive position of the housing. The stop ring 24 is then so positioned that the stop 18 is on an outer side of the upstanding edge 26. Advantageously, the housing is provided with cams which are arranged for cooperation with the stop 18. During electrical adjustment from the park position to the drive position a cam of the housing runs on the sloping surface 18d of the stop 18. Due to the stop 18 being opposite an upstanding edge 26, the stop ring 24 adjacent the upstanding edge 26 is so stiff that the stop 18 functions as a hard stop for the cam of the housing, so that the end position of the drive ring 24 is defined. Due to the stop 18 forming as it were a stiff stop, the end position of the drive ring 24 will not, or hardly so, be subject to vibration or movement or other change during driving, or as a result of a pulsating drive of the drive unit. This in contrast to a stop 18, as shown, for example, in FIG. 7, which is elastic also in the stop position.

Due to the stop ring 24 being adjustable, it is possible, for example during an electrical reset after manual adjustment from the park position to the drive position, for the stop ring 24 to adjust partly along with the housing until the stop element 25 abuts against a next upstanding against a next upstanding edge 26. In this position the stop 18 is in an opening between the upstanding edge 26, which allows a certain radial flexibility and/or elasticity in the stop ring 24. Due to this elasticity the drive ring 23 and/or the housing can simply pass the stop 18. The stop ring 24 is then in the release position to let the drive ring 23 pass.

By providing the stop 18 on a stop ring 24, in particular on an adjustable stop ring 24, in a simple and inexpensive manner, on the one hand a stiff stop for defining an end position of the drive ring 23 in the drive position of the housing can be obtained and on the other hand sufficient elasticity to lead the drive ring past the stop can be provided for.

Figure 10:
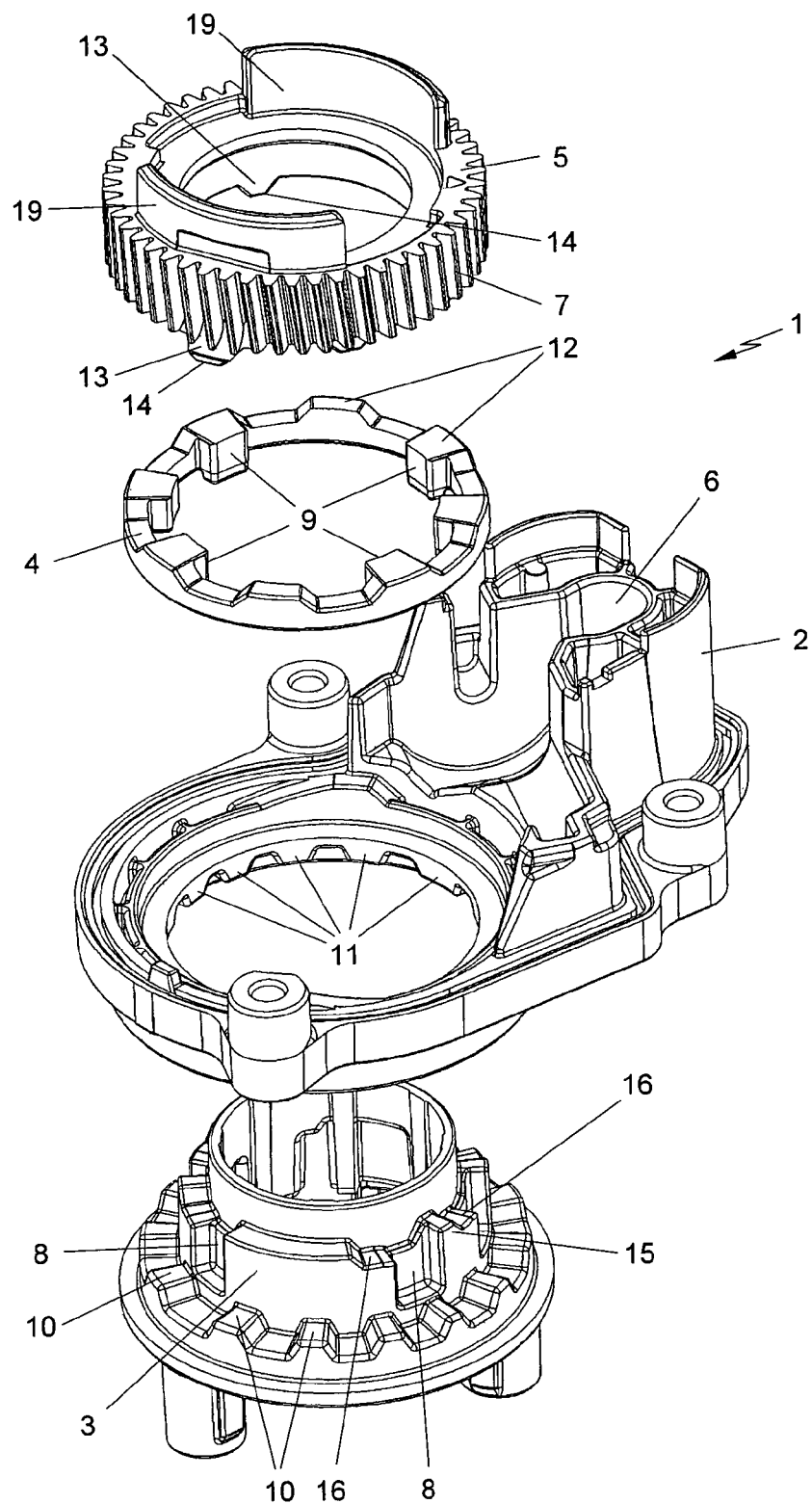
FIG. 10 shows a schematic perspective view of the adjustment instrument according to a second exemplary embodiment according to the invention.

FIG. 10 shows an adjustment instrument 1 for an exterior mirror unit for a vehicle comprising a housing 2 which is pivotable with respect to a base between a park position, a drive position and a fold-over position, and which is provided with a first series of cams 11;

an electrical drive unit which is received in the housing 2 for electrically driving the pivoting of the housing 2;

a drive ring 5 which is under spring force and which is arranged for cooperation with the electrical drive unit;

a clutch ring 5 which is provided on the drive ring, and which is arranged for transmitting the spring force;

a lock ring 4 which is located on the housing 2 and which is set up nonrotatably with respect to the base, and which in the drive position receives spring force via the clutch ring 5 and which outside the drive position is free of spring force;

a cam ring 3 which is provided on the base, and which in the drive position is free of spring force and which outside the drive position receives spring force via the clutch ring 5;

a second series of cams 10 which are set up nonrotatably with respect to the cam ring 3; wherein the series of cams 10, 11 in the drive position interlock and by the spring force can be pressed onto each other to define the drive position, and outside the drive position sit on each other and can slide over each other, and wherein the clutch ring 5, from the drive position towards the park position, is free to pivot with respect to the cam ring 3.

The measure of providing two series of cams 10, 11 which define the drive position and leaving the clutch ring 5 free to pivot from the drive position to the park position can prevent the drive becoming subject to large forces during pivoting of the housing 2 from the drive position in the direction of the park position.

When for the purpose of electrically driven pivoting of the housing 2 from the drive position in the direction of the park position, while the series of cams 10, 11 in the drive position interlock, the clutch ring 5 has a limited free stroke with respect to the housing 2 and the cam ring 3 between a first angular position in which the clutch ring 5 transmits the spring force onto the housing 2 and the cams 10, 11 are pressed onto each other by the spring force, and a second angular position in which the clutch ring 5 leaves the housing 2 free and transmits the spring force onto the cam ring 3, so that the cams 10, 11 are not pressed onto each other by the spring force, it can be achieved that the drive upon electrically driven adjustment does not need to work against the spring force. The clutch ring 5 can then remain axially at the same level with respect to the pivoting axis, so that the spring that provides the spring action does not need to be compressed.

When for the purpose of manual pivoting from the drive position in the direction of the park position, while the series of cams 10, 11 move apart, the clutch ring 5 has a free stroke with respect to the cam ring 3, and moves along with the housing 2, it can be achieved that the force of working against the spring is transferred via the cams, and with the drive, owing to free rotation of the clutch ring 5, remaining unloaded. The drive 2, the clutch ring 5, the gear ring 5 and the housing 2 can then move along as a whole.

By providing the series of cams 10, 11 on the base or the cam 5 ring 3, the construction can be configured with minor play. Alternatively, the second series of cams 10 may be provided, for example, on the lock ring 4. The lock ring 4 can then be axially slidable with respect to the base, and be indirectly nonrotatably connected therewith.

When of each series the cams 10, 11 are placed in a ring, and the intermediate distance between a number of successive cams is unequal, it can be achieved that the series of cams 10, 11 in a first position interlock and in a second position can be supported on each other in a stable manner. The spacing pattern of the cams in the series can then be selected such, for example, that the series, between the fold-over position and the park position, can interlock only in the drive position. The number of cams can then be selected to be, for example, greater than 5, or even greater than 10.

FIG. 10 thus shows an alternative second embodiment according to the invention, in which the series of first cams 11 of the housing 2 are arranged on the side of the housing 2 facing the cam ring 3. The series of first cams 11 cooperate with a series of second cams 10 which in this embodiment of the invention are arranged on the cam ring 3. In this manner the housing 2 can be so configured as to be rotation-locked directly to the fixed world.

In the drive position the force of the spring action is led via the clutch ring 5 and the lock ring 4 to the housing 2, so that the housing 2 is pressed onto the cam ring 3, which provides for a cooperating coupled rotation-locked condition of the cam rings 10, 11 in the drive position. The exterior mirror unit 1 can thus remain in the drive position, against the forces of, for example, driving wind.

After the housing 2 has been uncoupled with respect to the cam ring 3 and has been released, the housing 2 can relatively simply be further adjusted manually. The housing 2 is clear of the cam ring 3 and can simply rotate further over the cam ring 3.

The clutch ring 5, upon manual adjustment, is coupled to the housing 2 by means of the drive. Upon further manual adjustment of the housing 2 after uncoupling from the cam ring 3, the clutch ring 5 can run over the cam ring.

The invention is not limited to the exemplary embodiments represented here. For example, the spring 18 may be designed differently, as two separate elastic elements, or as one or more elastic elements implemented in spring steel. Also possible is a combination of different materials. Also, functions that are performed by the spring in this exemplary embodiment may be implemented differently, for example, with a hard stop or a smaller tolerance between the different parts of the adjustment instrument, or be omitted. Many variants are possible, and will be clear to one skilled in the art, within the scope of the following claims.

The invention claimed is:

1. An adjustment instrument for an exterior mirror unit for a vehicle comprising
   a housing which is pivotable with respect to a base between a park position, a drive position and a fold-over position, and which is provided with a first series of cams;
   an electrical drive unit which is received in the housing for electrically driving the pivoting of the housing;
   a drive ring which is under an axial spring force along a center axis of a clutch ring and which is arranged for cooperation with the electrical drive unit;
   the clutch ring is provided on the drive ring, and which is arranged for transmitting the axial spring force;
   a lock ring which is located on the housing and which is set up nonrotatably with respect to the base and which in the drive position receives the axial spring force via the clutch ring and which outside the drive position is free of the axial spring force during electrical adjustment to the park position;
   a cam ring which is provided on the base, and which in the drive position is free of the axial spring force;
   a second series of cams which are set up nonrotatably with respect to the cam ring and arranged for cooperation with the first series of cams, wherein
   the first and second series of cams interlock in the drive position and by the axial spring force are pressed onto each other to define the drive position, and outside the drive position sit on each other and can slide over each other, wherein
   the clutch ring, from the drive position towards the park position, is rotatably arranged with respect to the cam ring to rotate from a first angular position to a second angular position, and wherein
   for electrically driving pivoting of the housing from the drive position in the direction of the park position, while the first and second series of cams interlock in the drive position, the clutch ring has a limited free stroke in a rotational direction about the center axis of the clutch ring with respect to both the housing and the cam ring between the first angular position in which the clutch ring transmits the axial spring force onto the housing and the first and second series of cams are pressed onto each other by the axial spring force, and the second angular position in which the clutch ring transmits the axial spring force onto the cam ring and not onto the housing or the first and second series of cams, so that the first and second series of cams are not pressed onto each other by the axial spring force and wherein with the electrical drive electrically driving the pivoting of the housing, the electrical drive unit does not work against any series of cams subject to the axial spring force when the clutch ring is in the second angular position.

2. The adjustment instrument according to claim 1, wherein during manual pivoting from the drive position in the direction of the park position, while the first and second series of cams move apart, the clutch ring has a free stroke with respect to the cam ring, and moves along with the housing.

3. The adjustment instrument according to claim 1, wherein the second series of cams is provided on the base or the cam ring.

4. The adjustment instrument according to claim 1, wherein the second series of cams is provided on the lock ring.

5. The adjustment instrument according to claim 1, wherein of each series the cams are placed in a ring, and wherein an intermediate distance between a number of adjacent successive cams is unequal.

6. The adjustment instrument according to claim 1, wherein the lock ring cannot rotate relative to the cam ring.

7. The adjustment instrument according to claim 1, wherein with the pivoting of the housing between the fold-over position, the drive position and the park position the first and second series of cams can interlock only in the drive position.

8. The adjustment instrument according to claim 7, wherein the lock ring is adjustable between a first position in which it is coupled with the housing and a second position in which it has been moved in upward direction and is clear of the housing.

9. The adjustment instrument according to claim 7, wherein the lock ring is provided on one side with cams for cooperation with cams of the clutch ring and is provided on an opposite side with cams for cooperation with cams of the housing.

10. The adjustment instrument according to claim 8, wherein in the first position of the lock ring, cams provided on the clutch ring sit on cams provided on the lock ring.

11. The adjustment instrument according to claim 8, wherein during further rotation of the housing after uncoupling from the lock ring, the clutch ring runs on the cam ring.

12. The adjustment instrument according to claim 1, furthermore comprising a stop for defining an end position of the clutch ring in the drive position.

13. The adjustment instrument according to claim 12, wherein the stop is of elastic design.

* * * * *